(12) United States Patent
Winston (10) Patent No.: US 6,434,653 B1
(45) Date of Patent: Aug. 13, 2002

(54) METHOD AND APPARATUS FOR DISABLING POWER-ON IN A SYSTEM REQUIRING ADD-IN MODULES

(75) Inventor: Marcus R. Winston, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,291

(22) Filed: Sep. 29, 1998

(51) Int. Cl.$^7$ .............................................. G06F 13/00
(52) U.S. Cl. ..................... 710/303; 710/301; 710/302; 710/304

(58) Field of Search ...................... 714/7; 710/8, 302, 710/10, 301, 303, 304; 713/1, 2, 100, 300

(56) References Cited

U.S. PATENT DOCUMENTS

| | | | | |
|---|---|---|---|---|
| 5,210,855 A | * | 5/1993 | Bartol | 395/500 |
| 5,269,011 A | * | 12/1993 | Yanai et al. | 395/425 |
| 5,376,831 A | * | 12/1994 | Chen | 327/379 |
| 5,386,567 A | * | 1/1995 | Lien et al. | 395/700 |
| 5,579,491 A | * | 11/1996 | Jeffries et al. | 395/283 |
| 6,092,134 A | * | 7/2000 | Chun et al. | 710/102 |

\* cited by examiner

Primary Examiner—Peter Wong
Assistant Examiner—Tim Vo
(74) Attorney, Agent, or Firm—Blakely, Sokoloff, Taylor & Zafman LLP (57) ABSTRACT

A computer system includes a bus. A first connector is coupled to the bus. A power lock-out unit is coupled to the first connector. The power lock-out unit prevents a system power supply from receiving a power-on request when a first module is not coupled to the fiist connector.

23 Claims, 7 Drawing Sheets

METHOD AND APPARATUS FOR DISABLING POWER-ON IN A SYSTEM REQUIRING ADD-IN MODULES

FIELD OF THE INVENTION

The present invention relates to computer systems. More specifically, the present invention relates to a method and apparatus for disabling power-on in a computer system that requires add-in modules.

BACKGROUND OF THE INVENTION

High speed buses such as the Gunning Transceiver Logic Plus (GTL+) bus (Pentium Pro Family Developers Manual, Volume 1 Specification, published 1996) require the use of resistors at the physical ends of its electrical traces to properly terminate the bus. The resistors provide an electrical pull-up function and act as a lumped impedance load to minimize signal reflections off the ends of the traces. The Pentium II processor incorporates GTL+ bus termination resistors within the Single Edge Connector (SEC) cartridge enclosing the processor. A computer system designed to use two Pentium II processors is designed with the Slot 1 connectors located at the physical ends of each GTL+ bus trace. Therefore, when two processors are installed in a dual Slot 1 system, each trace on the GTL+ bus is properly terminated via the termination resistors in the SEC cartridges.

If a GTL+ bus operates with only one end of its traces terminated, the reliability of the computer system in which the bus is implemented on may be severely degraded. While a computer system may seem to be operating normally with an improperly terminated GTL+ bus, it is possible for data to be irreversibly corrupted without warning.

Operators of computer systems who attempt to terminate a GTL+ bus by inserting an SEC cartridge during or after powering up of the computer system may cause severe damage to the processor or the motherboard. Improper mating of electrical contacts on an SEC cartridge with electrical contacts on a connector on the motherboard during powering up may result in electrical shorts. In some instances, the electrical shorts may cause a serious safety hazard.

SUMMARY

A computer system is disclosed. The computer system includes a bus. A first connector is coupled to the bus. A power lock-out unit is coupled to the first connector. The power lock-out unit prevents a system power supply from receiving a power-on request when a first module is not coupled to the first connector.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
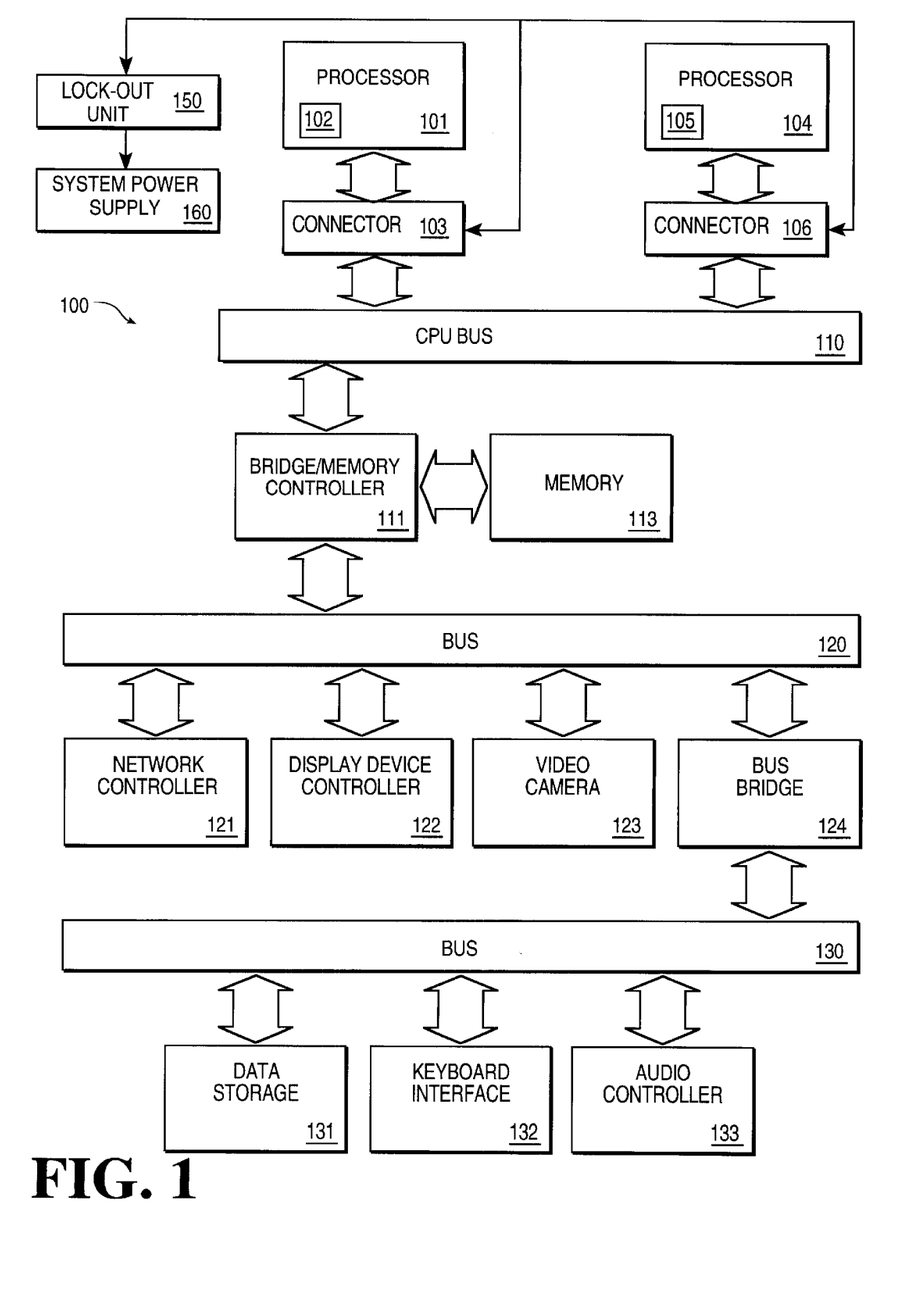
FIG. 1 is a block diagram of a computer system implementing an embodiment of the present invention.

FIG. 1 illustrates a computer system 100 upon which an embodiment of the present invention can be implemented. The computer system 100 includes a CPU bus 110. A first slot connector 103 and a second slot connector 106 are coupled to the CPU bus 110. The first and second slot connectors 103 and 106 may operate to connect processors to the CPU bus 110. According to an embodiment of the present invention, the computer system 100 includes a processor 101 that may be connected to the CPU bus 110 via the first slot connector 103 and a processor 104 that may be connected to the CPU bus 110 via the second slot connector 106. The processors 101 and 104 process data signals. The processors 101 and 102 may be complex instruction set computer (CISC) microprocessors, reduced instruction set computing (RISC) microprocessors, very long instruction word (VLIW) microprocessors, processors implementing a combination of instruction sets, or other processor devices. The processors 101 and 104 transmit data signals to other components in the computer system 100 via the CPU bus 110. According to an embodiment of the computer system 100, the processor 101 and the processor 104 are implemented in processor cartridges where each of the processors 101 and 104 include bus termination circuitry that properly terminate the traces (not shown) on each end of the CPU bus 110. It should be appreciated that other connector devices may be used in place of the first and second slot connectors 103 and 106. A termination card (not shown) may be coupled to either one of the first connector 103 or the second connector 104 in place of one of the processors 101 and 104. The termination card includes termination circuitry that properly terminates traces on the CPU bus 110.

A power lock-out unit 150 is coupled to the first slot connector 103 and the second slot connector 106. The power lock-out unit 150 operates to detect when either the first slot connector 103 or the second slot connector 106 is vacant. When one of the slot connectors 103 and 106 is not connected to either a processor or a termination card, the power lock-out unit 150 cuts off power-on requests to a system power supply 160. By cutting off power-on requests to the system power supply 160, the power lock-out unit 150 prevents the system power supply 160 from supplying normal operating power to the computer system 100 which prevents the computer system 100 from operating in a state where data may be irreversibly corrupted by reflections on an improperly terminated CPU bus 110. By preventing the system power supply 160 from supplying normal operating power to the computer system 100, the power lock-out unit 150 reduces the dangers associated with when an operator inserts a processor into a connector when power is supplied to the computer system 100. FIG. 1 shows an example of the present invention implemented on a dual processor computer system 100. However, it is understood that the present invention may be implemented in a computer system having any number of slot connectors and processors.

According to an embodiment of the computer system 100, processors 101 and 104 are Pentium II Processors, the first slot connector 103 and the second slot connector 106 are Slot 1 connectors, and the CPU bus 110 is a GTL+ bus.

The computer system 100 includes a memory 113. The memory 113 may be a dynamic random access memory (DRAM) device, a synchronous direct random access memory (SDRAM) device, or other memory device. The memory 113 may store instructions and code represented by data signals that may be executed by the processor 101. According to an embodiment of the computer system 100, the memory 113 includes a memory system having a plurality of memory modules. Each of the memory modules includes a printed circuit board having a plurality of memory devices mounted on the printed circuit board. The printed circuit board operates as a daughter card insertable into a socket connector that is connected to the computer system 100.

A cache memory 102 resides inside processor 101 and a cache memory 105 resides inside processor 104. The cache memories 102 and 105 store data signals stored in memory 113. The cache memories 102 and 105 speed up memory accesses by the processors 101 and 105 by taking advantage of its locality of access. In an alternate embodiment of the computer system 100, the cache memories 102 and 105 reside external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device controller 122 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100. A video camera 123 is coupled to the first I/O bus 120.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard (not shown) to the computer system 100 and transmits data signals from a keyboard to the computer system 100. An audio controller 133 is coupled to the second I/O bus 130. The audio controller 133 operates to coordinate the recording and playing of sounds.

A bus bridge 124 couples the first I/O bus 120 to the second I/O bus 130. The bus bridge 124 operates to buffer and bridge data signals between the first I/O bus 120 and the second I/O bus 130.

Figure 2:
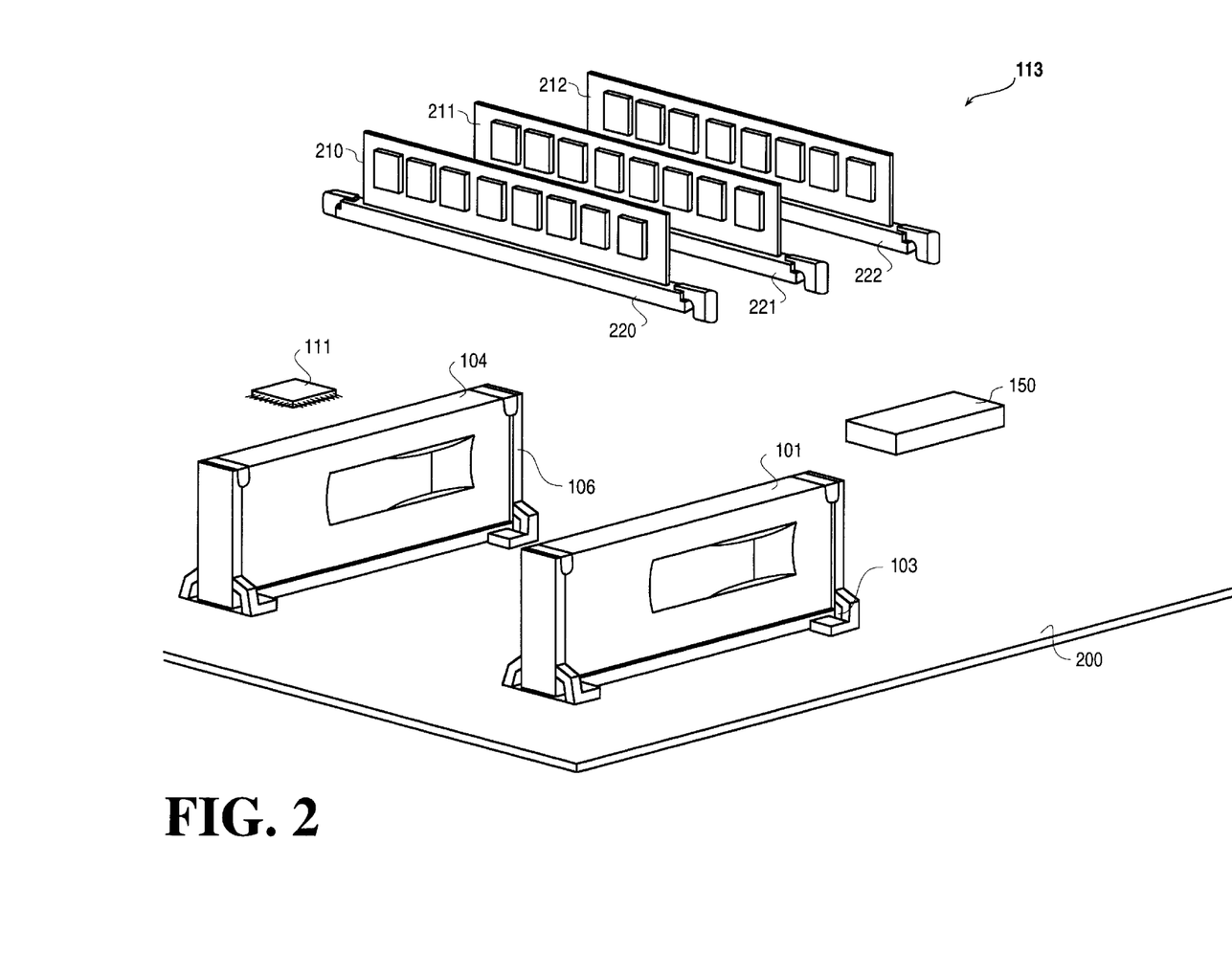
FIG. 2 illustrates a lock-out unit on a motherboard according to an embodiment of the present invention.

FIG. 2 illustrates the power lock-out circuit 150 implemented on a motherboard 200 according to an embodiment of the present invention. The motherboard 200 is a printed circuit board that interconnects components of the computer system 100 (shown in FIG. 1). The bridge memory controller 111 and the memory system 113 are coupled to the motherboard 200. The memory system includes a plurality of socket connectors 220–222 mounted on the motherboard 200. The memory system 113 includes a plurality of memory modules 210–212. Each of the memory modules includes a plurality of memory devices mounted on the memory module. The memory modules 210–212 are insertable into the socket connectors 220–222. Electrical connectors (not shown) on the memory module interface with electrical contacts (not shown) on the socket connector. The electrical connectors and the electrical contacts allow components on the motherboard 200 to access the memory devices on the memory module.

The first slot connector 103 and the second slot connector 106 are mounted on the motherboard 200. The processor 101 may be connected to the motherboard 200 via the first slot connector 103. The processor 104 may be connected to the motherboard 200 via the second slot connector 106. Alternatively, a termination card (not shown) may be inserted into either the first slot connector 103 or the second slot connector 106.

The power lock-out unit 150 is electrically connected to the motherboard 200. According to an embodiment of the present invention, the power lock-out unit 150 is an integrated circuit mounted on the motherboard 200. According to an embodiment of the present invention, the power lock-out unit 150 includes electronic circuitry fabricated on the motherboard 200. It should be appreciated that the power lock-out unit 150 may be electrically connected to the motherboard 200 using any known circuitry or technique.

Figure 3:
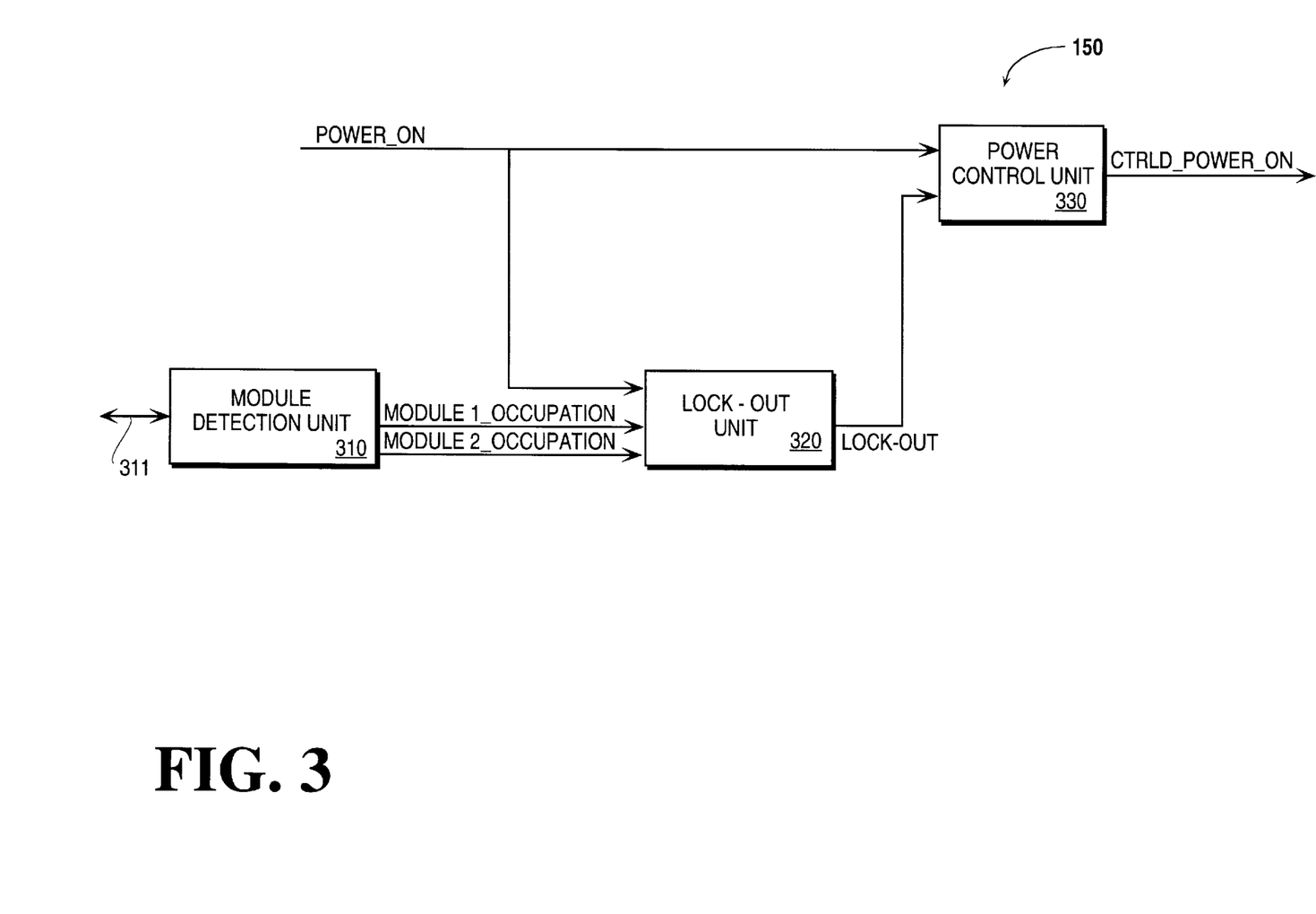
FIG. 3 is a block diagram of a power lock-out unit according to an embodiment of the present invention.

FIG. 3 is a block diagram of a power lock-out unit according to an embodiment of the present invention. The power lock-out unit includes a module detection unit 310. The module detection unit 310 generates a module inserted signal for each slot connector in the computer system 100 (shown in FIG. 1). Each slot connector in the computer system 100 is connected to the module detection unit 310 via a corresponding module detection connection. Line 311 in FIG. 3 illustrates a plurality of module detection connections that connects the module detection unit 310 to a plurality of slot connectors. According to an embodiment of the present invention, a first module detection connection transmits a first module occupation signal (MODULE1_OCCUPATION) from the module detection unit 310 to the first slot connector 103 (shown in FIG. 1). The first slot connector 103 returns the first module occupation signal on the first module detection connection. The first module occupation signal corresponds to a state of whether the first slot connector 103 is occupied by a processor or a termination card or whether the first slot connector 103 is vacant. According to an embodiment of the present invention, the module detection unit 310 generates a first module occupation signal to the first slot connector 103 on the first module detection connection that is a high signal. The first slot connector 103 returns a low signal to the module detection unit 310 when the first slot connector 103 is occupied and returns a high signal to the module detection unit 310 when it is vacant.

Similarly, a second module detection connection transmits a second module occupation signal from the module detection unit 310 to the second slot connector 106 (shown in FIG. 1). The second slot connector 106 returns the second module occupation signal back to the module detection unit 310 on the second module detection connection. The second module occupation signal corresponds to a state of whether the second slot connector 106 is occupied by a processor or a termination card or whether the second slot connector 106 is vacant. According to an embodiment of the present invention, the module detection unit 310 generates a second module occupation signal (MODULE2_OCCUPATION) to the second slot connector 106 on the second module detection connection that is a high signal. The second slot connector 106 returns a low signal to the module detection unit 310 when the second slot connector 106 is occupied and returns a high signal to the module detection unit 310 when it is vacant.

A lock-out unit 320 is coupled to the module detection unit 310. The lock-out unit 320 receives any number of module occupation signals supported by the module detection unit 310 and power-on requests to the system power supply 160 (shown in FIG. 1) to power on the computer system 100. The lock-out unit 320 generates a lock-out signal (LOCK-OUT) that operates to prevent the computer system 100 from being powered-on. The lock-out unit 320 de-asserts the lock-out signal when all module occupation signals received from the module detection unit 310 indicate that all corresponding connectors are occupied during a period when a power-on request is not made to the computer system 100.

A power control unit 330 is coupled to the lock-out unit 320. The power control unit 330 receives the lock-out signal from the lock-out unit 320 and the power-on requests to the system power supply 160. The power control unit 320 generates a controlled power-on signal (CTRLD_POWER_ON) in response to receiving a power-on request when a lock-out signal is not received from the lock-out unit 320. The controlled power-on signal is transmitted to the system power supply 160 and is interpreted by the system power supply 160 as a power-on request.

If the lock-out unit 320 determines that either the first or second connectors 103 or 106 is vacant from the MODULE1_OCCUPATION or MODULE2_OCCUPATION signals, it asserts the LOCK-OUT signal which causes the power control unit 330 to de-assert the CTRLD_POWER_ON. This turns the system power supply 160 that is in an on state off and causes a system power supply 160 in an off state to remain in the off state. If the POWER_ON signal is activated while the LOCK-OUT signal is asserted, the power control unit 330 keeps the CNTRLD_POWER_ON signal de-asserted until the LOCK-OUT signal is de-asserted. The LOCK-OUT signal is de-asserted only when both the first and second connectors 103 and 106 are occupied and the POWER_ON signal has been de-asserted.

The lock-out unit 320 and the power control unit 330 prevents the system power supply 160 from being allowed to turn on immediately upon insertions of modules into the first and second slot connectors 103 and 106. Such operation has been observed to cause damage to the modules. It is possible for the MODULE1_OCCUPATION or MODULE2_OCCUPATION signals to be asserted without the modules being fully seated into the connectors 103 or 106. The slot connector 103 or 106 could have some of its connections shorted together when a module is only partially seated.

FIG. 3 describes a power lock-out unit that detects the vacancies of two processor connectors. It should be appreciated that the power lock-out unit 150 may be used to detect the vacancies of any number or type of connectors including processor connectors, memory connectors, and other connectors. It should be appreciated that the module detection unit 310, lock-out unit 320, and power control unit 330 may be implemented using any known circuitry or technique. In an embodiment of the present invention where the power-lock out unit 150 is implemented in hardware, the module detection unit 310, lock-out unit 320, and power control unit 330 all reside on a single semiconductor substrate.

Figure 4:
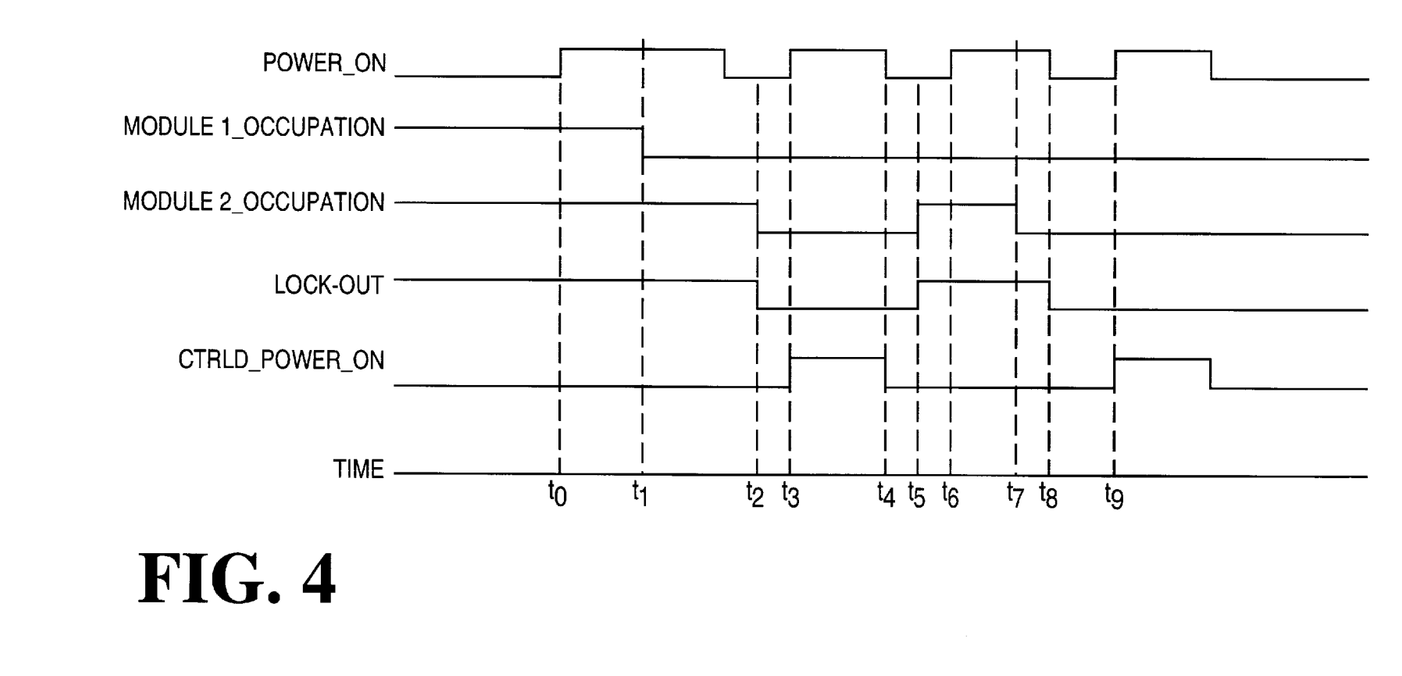
FIG. 4 is a timing diagram illustrating the inputs and outputs to the power lock-out unit according to an embodiment of the present invention.

FIG. 4 is a timing diagram illustrating the inputs and outputs to the power lock-out unit 150 according to an embodiment of the present invention. At time t0, the POWER_ON signal is asserted indicating that a power-on request to the system power supply 160 (shown in FIG. 1) is made to power the computer system 100. According to an embodiment of the present invention, the POWER_ON signal is high when asserted. The first and second slot connectors 103, 106 (shown in FIG. 1) are vacant, however, which causes the MODULE1_OCCUPATION and MODULE2_OCCUPATION signals to be de-asserted. As a result of the MODULE1_OCCUPATION and MODULE2_OCCUPATION signals being de-asserted, the LOCK-OUT signal is asserted and the CTRLD_POWER_ON signal is de-asserted. Thus, the system power supply 160 is not powered-on. According to an embodiment of the present invention, the MODULE1_OCCUPATION and MODULE2_OCCUPATION signals are high when they are de-asserted, the LOCK-OUT signal is high when asserted, and the CTRLD_POWER_ON signal is low when it is de-asserted.

At time t1, the first slot connector 103 is occupied which results in the MODULE1_OCCUPATION signal being asserted. However, because the second slot connector 106 is still vacant, the LOCK-OUT signal remains asserted and CTRLD_POWER_ON remains de-asserted.

At time t2, both the first and second slot connectors 103 and 106 are occupied, resulting in both MODULE1_OCCUPATION and MODULE2_OCCUPATION signals being asserted. The POWER-ON signal is also de-asserted at time t2. Thus, the LOCK-OUT signal is de-asserted. The CTRLD_POWER-ON signal remains de-asserted until time t3 when a power-on request is made to the computer system and the POWER_ON signal is asserted. The CTRLD_POWER_ON signal remains asserted until time t4 when the power-on request is terminated and the POWER_ON signal is de-asserted.

At time t5, the second slot connector 106 is vacant which causes the MODULE2_OCCUPATION signal to be de-asserted. As a result, the LOCK-OUT signal is asserted which causes the CTRL_POWER_ON signal to be asserted which causes the CTRLD_POWER_ON signal, which was de-asserted at t4 to remain de-asserted. The CNTRLD_POWER_ON remains de-asserted at t6 even though POWER_ON is asserted at t6.

At time t7, the second slot connector 106 once again becomes occupied which causes the MODULE2_OCCUPATION signal to be asserted. However, because the POWER_ON signal is also asserted at time t6, the LOCK-OUT signal remains asserted and the CTRLD_POWER_ON signal remains de-asserted.

At time t8, the POWER ON signal is de-asserted while both the MODULE1_OCCUPATION and MODULE2_OCCUPATION signals are asserted. This causes the LOCK-OUT signal to be de-asserted. The CTRLD_POWER ON signal remains de-asserted until the POWER_ON signal is asserted at time t9.

Figure 5:
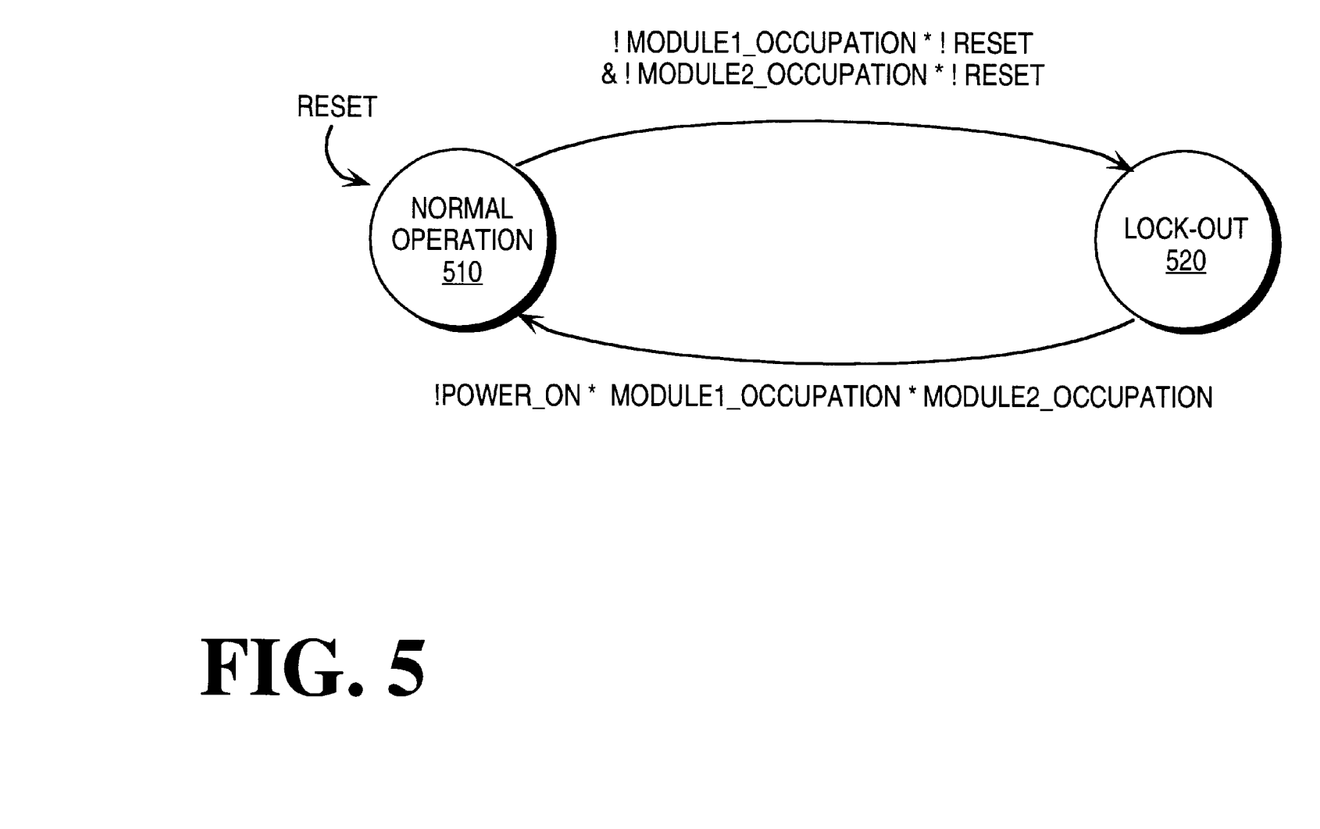
FIG. 5 is a state diagram of a power lock-out unit according to an embodiment of the present invention.

FIG. 5 is a state diagram of a lock-out unit 320 according to an embodiment of the present invention. The lock-out unit 320 includes a normal operation state 510 and a lock-out state 520. The lock-out unit 320 is initially set to the normal operation state 510 upon receiving a reset signal. A reset signal is a power-on/power-off reset based on an auxiliary power supply which powers the power lock-out circuit 150 (shown in FIG. 1).

After the reset signal is de-asserted, if either the MODULE1_OCCUPATION or MODULE2_OCCUPATION signals are high, indicating that a module is not present, the lock-out unit 320 enters into its lock-out state 520. When the lock-out unit 320 is in its lock-out state, it generates a lock-out signal which is transmitted to the power control unit 320 (shown in FIG. 3). The lock-out unit 320 remains in the lock-out state 520 until both the MODULE1_OCCUPATION and MODULE2_OCCUPATION signals are asserted, and the POWER_ON signal is inactive. Alternatively, the lock-out unit 320 may return to the normal operation state 510 when the reset signal is received. At the normal operation state 510, the system power supply is allowed to supply normal operating power to the computer system upon receiving a controlled power-on signal from the power control unit 330.

Figure 6:
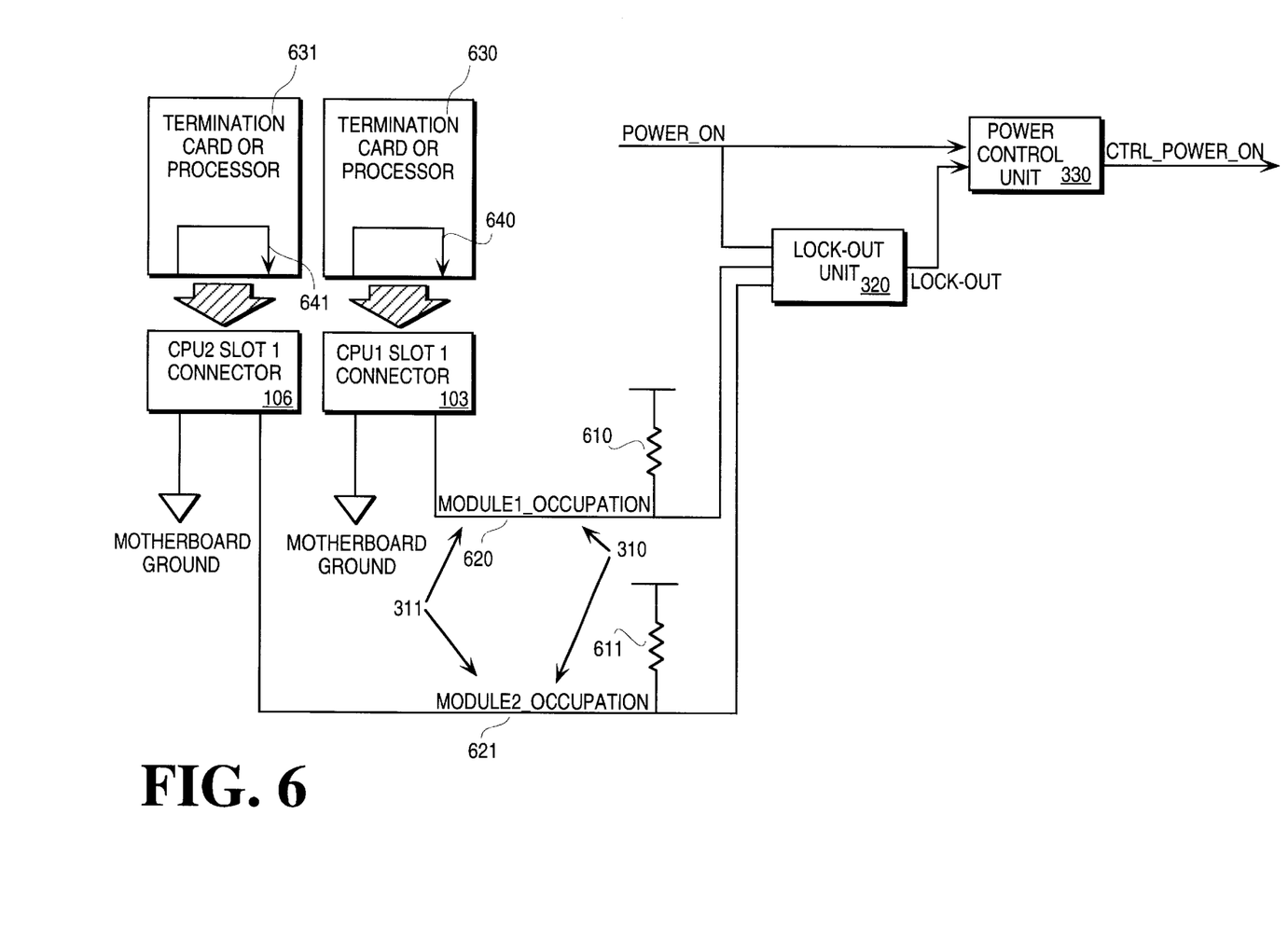
FIG. 6 illustrates a module detection circuit interfacing with a computer system according to an embodiment of the present invention.

FIG. 6 illustrates the module detection unit 310 of the power lock-out unit 150 according to an embodiment of the present invention. The module detection unit 310 includes a first pull-up resistor 610 connected to Vcc and a second pull-up resistor 611 connected to Vcc. The module detection unit 310 is connected to the first slot connector 103 and the second slot connector 106 via the module detection connections 311. The module detection connections 311 include a first module detection connection 620 that connects the first pull-up resistor 610 to the first slot connector 103. The first module detection connection 620 transmits a MODULE1_OCCUPATION signal to the first slot connector 103. The MODULE1_OCCUPATION signal transmitted to the first slot connector 103 is a high signal. The first slot connector 103 returns a low signal on the first module detection connection 620 when the first slot connector 103 is occupied and returns a high signal when it is vacant. The module detection connections 311 include a second module detection connection 621 that connects the second pull-up resistor 611 to the second slot connector 106. The second module detection connection 621 transmits MODULE2_OCCUPATION signal to the second slot connector 106. The MODULE2_OCCUPATION signal transmitted to the second slot connector 106 is a high signal. The second slot connector 106 returns a low signal on the second module detection connection 621 when the second slot connector 106 is occupied and returns a high signal when it is vacant.

Blocks 630 and 631 represent processor or termination cards according to the present invention. The processor or termination cards 630 and 631 are coupled to the computer system 100 (shown in FIG. 1) via the first slot connector 103 and the second slot connector 106. The first slot connector 103 includes a first slot connector connection (not shown) that routes the first module detection connection 620 to a first electrical contact (not shown) on the first slot connector 103. The first slot connector 103 includes a second slot connector connection (not shown) that couples a second electrical contact (not shown) on the first slot connector 103 to a ground connection (not shown). Similarly, the second slot connector 106 includes a first slot connector connection (not shown) that routes the second module detection connection 621 to a first electrical contact (not shown) on the first slot connector 106. The second slot connector 106 includes a second slot connector connection (not shown) that couples a second electrical contact (not shown) on the second slot connector 106 to a ground connection (not shown).

In addition to including processor circuitry (not shown) and/or termination circuitry (not shown), the processor or termination cards 630 and 631 also include lock-out unit interfaces 640 and 641. The lock-out unit interface 640 operates to receive a MODULE1_OCCUPATION signal from the first module detection connection 620 via the first slot connector 103. The lock-out unit interface 640 returns a MODULE1_OCCUPATION signal on the first slot occupation connection 620 that indicates that the first slot connector 103 is occupied. According to an embodiment of the present invention, the lock-out unit interface 640 includes a signal line that couples the first electrical contact with the second electrical contact on the first slot connector 103 when the processor 101 interfaces with the first slot connector 103. Similarly, the lock-out unit interface 641 operates to receive a MODULE2_OCCUPATION signal from the second module detection connection 621 via the second slot connector 106. The lock-out unit interface 641 returns a MODULE2_OCCUPATION signal on the second slot occupation connection 621 that indicates that the second slot connector 106 is occupied. According to an embodiment of the present invention, the lock-out unit interface 641 includes a signal line that couples the first electrical contact with the second electrical contact on the second slot connector 106 when the processor 101 interfaces with the first slot connector 106.

FIG. 6 illustrates a lock-out unit 150 that monitors the slot connectors of processors. It should be appreciated that the lock-out unit 150 may also be implemented to monitor interfaces of other components coupled to other buses in the computer system for vacancies. For example, the lock-out unit 150 may monitor the socket connectors 220–222 (shown in FIG. 2) of the memory system 113 for vacancies of memory modules. Alternatively, the lock-out unit 150 may monitor a single interface of a component for vacancy instead of a plurality of interfaces.

Figure 7:
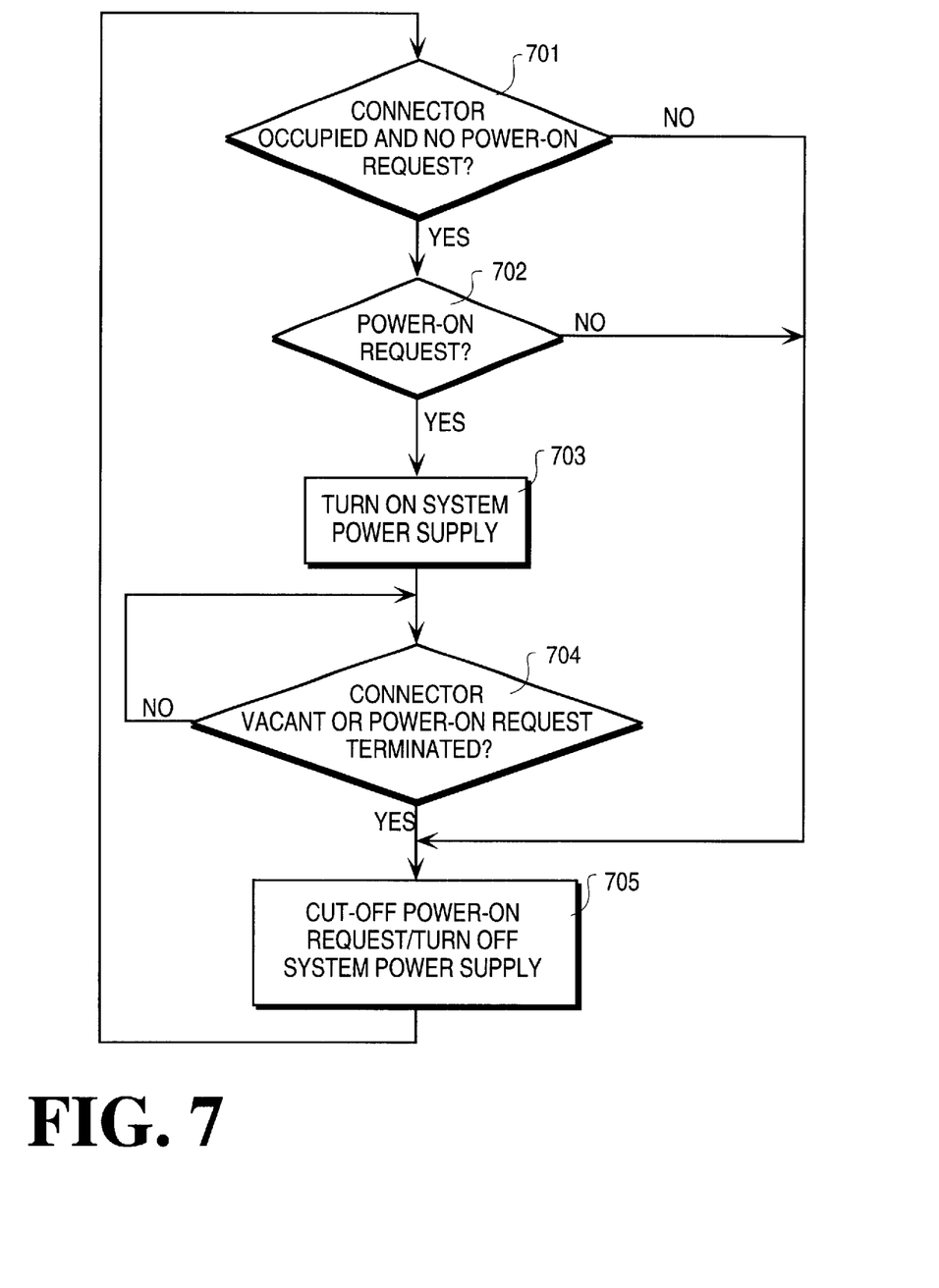
FIG. 7 is a flow chart that illustrates a method for managing a computer system according to an embodiment of the present invention.

FIG. 7 is a flow chart that illustrates a method for managing a computer system according to an embodiment of the present invention. At step 701, it is determined whether a connector in a computer system is occupied during a period of time when no power-on request is made to the computer system. If the connector is occupied during a period of time when no power-on request is made to the computer system, control proceeds to step 702. If the connector is not occupied during a period of time when no power-on request is made to the computer system, control proceeds to step 705. According to an embodiment of the present invention, determining whether a connector in the computer system is occupied is achieved by monitoring a module detection connection corresponding to the connector. According to an embodiment of the present invention, determining whether a power-on request is made to the computer system is achieved by monitoring a power-on request line.

At step 702, it is determined whether a power-on request is made to the computer system. If a power-on request is made to the computer system, control proceeds to step 703. If a power-on request is not made to the computer system, control proceeds to step 705.

At step 703, the system power supply to the computer system is allowed to be turned on in response to the power-on request. Control proceeds to step 704.

At step 704, determine if the connector is vacant or if the power-on request to the computer system is terminated. If the connector is vacant or if the power-on request to the computer system is terminated, control proceeds to step 705. If the connector is not vacant or if the power-on request to the computer system is not terminated, control returns to step 704.

At step 705, requests to power-on the computer system is not transmitted to the system power supply and the system power supply is prevented from delivering normal operational power to the computer system. Control proceeds to step 701.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A computer system, comprising:
   a bus;
   a power supply coupled to the bus that provides power to the computer system upon receiving a power-on request; and
   a motherboard, coupled to the power supply, including:
      a first connector coupled to the bus; and
      a power lock-out unit, coupled to the first connector, that prevents the power supply from receiving the power-on request when a first module is not coupled to the first connector.

2. The computer system of claim 1 wherein the power lock-out unit prevents the power supply from supplying normal operating power to the computer system when the first module is not coupled to the first connector.

3. The computer system of claim 1 wherein the power lock-out unit comprises a lock-out unit, coupled to the first connector, that generates a lock-out signal until a first module occupation signal is received.

4. The computer system of claim 1 wherein the motherboard further comprises a second connector coupled to the bus.

5. The computer system of claim 1 wherein the module is a processor card.

6. The computer system of claim 1 wherein the module is a memory card.

7. The computer system of claim 1 wherein the power lock-out unit further comprises a module detection unit that includes:
   a signal generation unit that generates a signal in a first state; and
   a module detection connection that couples the first connector to the signal generation unit.

8. The computer system of claim 4 wherein the power lock-out unit is coupled to the second connector and prevents the system power supply from receiving the power-on request when a second module is not coupled to the second connector when the power-on is requested.

9. The computer system of claim 7 wherein the first connector comprises:
   a first connector connection that routes the module detection to a first electrical contact on the first connector; and
   a second connector connection that couples a second electrical contact on the first connector to a ground connection.

10. The computer system of claim 7 wherein the signal generation unit comprises a pull-up resistor connected to a voltage source.

11. The computer system of claim 9 wherein the first module comprises a signal line that couples the first electrical contact with the second electrical contact when the first module interfaces with the first connector.

12. A computer system, comprising:
    a bus;
    a power supply coupled to the bus that provides power to the computer system upon receiving a power-on request; and
    a motherboard, coupled to the power supply, including:
       a first connector coupled to the bus;
       a first module coupled to the first connector;
       a second connector coupled to the bus; and
       a power lock-out unit, coupled to the first and second connectors, that prevents the power supply from receiving power-on request in response to receiving a module occupation signal that indicates a second module is not coupled to the second connector.

13. The computer system of claim 12 wherein the power lock-out unit prevents the power supply from supplying normal operating power to the computer system when the second module is not coupled to the second connector.

14. A computer system, comprising:
    a processor bus;
    a power supply coupled to the processor bus that provides power to the computer system upon receiving a power-on request;
    a first connector coupled to the processor bus; and
    a power lock-out unit, coupled to the first connector, that generates a lock-out signal in order to prevent the power supply from receiving the power-on request when a first processor card is not coupled to the first connector.

15. The computer system of claim 14 wherein the power lock-out unit prevents the power supply from supplying normal operating power to the computer system when the first processor card is not coupled to the second connector.

16. The computer system of claim 14 wherein the computer system further comprises a second connector coupled to the processor bus.

17. The computer system of claim 16 wherein the power lock-out unit is coupled to the second connector and prevents the system power supply from granting the power-on request when a second processor card is not coupled to the second connector.

18. A motherboard, comprising:
    a first connector, and
    a power lock-out unit, coupled to the first connector and a power supply that provides power to the motherboard upon receiving a power-on request, that prevents the power supply from receiving the power-on request when a first module is not coupled to the first connector.

19. The motherboard of claim 18 further comprising a second connector.

20. The motherboard of claim 18 wherein the power lock-out unit comprises:

a lock-out unit, coupled to the first connector, that generates a lock-out signal until a first module occupation signal is received;

a signal generation unit that generates a signal in a first state; and a module detection connection that couples the first connector to the signal generation unit.

21. The motherboard of claim 19 wherein the power lock-out unit is coupled to the second connector and prevents the power supply from receiving the power-on request when a second processor card is not coupled to the second connector.

22. The motherboard of claim 20 wherein the first connector comprises:

a first connector connection that routes the module detection to a first electrical contact on the first connector; and a second connector connection that couples a second electrical contact on the first connector to a ground connection.

23. The motherboard of claim 22 wherein the first module comprises a signal line that couples the first electrical contact with the second electrical contact when the first module interfaces with the first connector.

* * * * *

UNITED STATES PATENT AND TRADEMARK OFFICE
CERTIFICATE OF CORRECTION

PATENT NO.    : 6,434,653 B1
DATED         : August 13, 2002
INVENTOR(S)   : Winston It is certified that error appears in the above-identified patent and that said Letters Patent is hereby corrected as shown below:

<u>Title page,</u>
Item [57], ABSTRACT,
Line 5, delete "fiist", insert -- first --.

Signed and Sealed this

Fourth Day of February, 2003

JAMES E. ROGAN
*Director of the United States Patent and Trademark Office*